US 9,297,183 B2

(12) United States Patent
Williams

(10) Patent No.: US 9,297,183 B2
(45) Date of Patent: Mar. 29, 2016

(54) SELF-ADJUSTING STRIKER ASSEMBLY

(71) Applicant: David A. Williams, Milton, FL (US)

(72) Inventor: David A. Williams, Milton, FL (US)

(73) Assignee: Daws Manufacturing Company, Inc., Pensacola, FL (US)

( * ) Notice: Subject to any disclaimer, the term of this patent is extended or adjusted under 35 U.S.C. 154(b) by 349 days.

(21) Appl. No.: 13/784,135

(22) Filed: Mar. 4, 2013

(65) Prior Publication Data

US 2013/0180991 A1 Jul. 18, 2013

Related U.S. Application Data

(63) Continuation-in-part of application No. 13/305,856, filed on Nov. 29, 2011, now Pat. No. 8,733,807, which is a continuation-in-part of application No. 12/714,893, filed on Mar. 1, 2010, now Pat. No. 8,382,171.

(51) Int. Cl.
| E05B 15/02 | (2006.01) |
| B65G 45/16 | (2006.01) |
| E05B 85/04 | (2014.01) |
| E05B 65/00 | (2006.01) |
| E05B 77/00 | (2014.01) |

(52) U.S. Cl.
CPC ............ E05B 15/024 (2013.01); B65G 45/16 (2013.01); E05B 85/045 (2013.01); E05B 65/006 (2013.01); E05B 77/00 (2013.01); E05B 2015/027 (2013.01); Y10T 292/696 (2015.04)

(58) Field of Classification Search
CPC ............ E05B 47/0047; E05B 15/0205; E05B 63/244; Y10T 29/79826
USPC ................... 292/341.15, 341.18, 341.19, 340
See application file for complete search history.

(56) References Cited

U.S. PATENT DOCUMENTS

| 148,662 A | 3/1874 | Burr |
| 446,173 A | 2/1891 | Hancock |
| 2,275,760 A | 3/1942 | Hoffman |
| 2,428,207 A | 9/1947 | Dzurinda |
| 2,583,391 A | 1/1952 | Quinn |
| 2,669,477 A | 2/1954 | Jewell |
| 3,179,458 A | 4/1965 | Sconzo |
| 4,305,611 A | 12/1981 | Robins |
| 4,432,575 A | 2/1984 | Garvey et al. |
| 4,470,626 A | 9/1984 | Gorgoe et al. |
| 4,480,862 A | 11/1984 | Fleming |
| 4,522,436 A | 6/1985 | Hoen et al. |
| 4,988,134 A | 1/1991 | Vidwans et al. |
| D319,001 S | 8/1991 | Weinerman et al. |
| 5,161,851 A | 11/1992 | Rafi-Zadeh |
| 5,193,868 A | 3/1993 | O'Toole |
| 5,226,302 A | 7/1993 | Anderson |

(Continued)

FOREIGN PATENT DOCUMENTS

| AU | 703274 B2 | 7/1996 |
| CA | 1046552 A1 | 1/1979 |

(Continued)

Primary Examiner — Kristina Fulton
Assistant Examiner — Faria Ahmad
(74) Attorney, Agent, or Firm — GrayRobinson, PA; Thomas L. Kautz

(57) ABSTRACT

A self-adjusting striker assembly, for use with a box having a lid, a box body and a latch, includes a striker bar mounted to the lid which is operative to move linearly relative to the latch in the event of misalignment between the lid and box body.

14 Claims, 13 Drawing Sheets

(56) References Cited

U.S. PATENT DOCUMENTS

| | | | |
|---|---|---|---|
| 5,342,103 A | 8/1994 | Tame et al. | |
| 5,524,978 A | 6/1996 | Tunis et al. | |
| 5,707,092 A | 1/1998 | Van Slembrouck et al. | |
| 5,938,254 A | 8/1999 | Weyerstall | |
| 6,149,213 A | 11/2000 | Sokurenko et al. | |
| 6,334,560 B1 | 1/2002 | Lentini | |
| 6,502,435 B2 | 1/2003 | Watts et al. | |
| 6,783,163 B2 | 8/2004 | Sadler | |
| 6,817,637 B1 | 11/2004 | Anderson | |
| 7,029,043 B2 * | 4/2006 | Fisher | 292/341.13 |
| 7,032,417 B2 | 4/2006 | Toulis et al. | |
| 7,261,337 B2 | 8/2007 | Nakagome et al. | |
| 7,322,127 B2 | 1/2008 | Hwang | |
| 7,341,292 B2 | 3/2008 | Brose et al. | |
| 7,344,169 B2 * | 3/2008 | Han | 292/340 |
| 7,416,228 B2 | 8/2008 | Pfitzinger et al. | |
| 7,469,945 B2 | 12/2008 | Dennis | |
| 7,568,745 B2 | 8/2009 | Brose et al. | |
| 7,744,135 B2 | 6/2010 | Wiese et al. | |
| 8,047,584 B2 * | 11/2011 | Rock | 292/340 |
| 8,167,341 B2 * | 5/2012 | Gruber et al. | 292/216 |
| 2006/0145487 A1 | 7/2006 | Wilder | |
| 2009/0108591 A1 | 4/2009 | DeVries | |
| 2010/0314890 A1 * | 12/2010 | Hemingway et al. | 292/341.16 |
| 2012/0086224 A1 * | 4/2012 | Novajovsky et al. | 292/341.18 |

FOREIGN PATENT DOCUMENTS

| | | |
|---|---|---|
| CN | 200943344 Y | 9/2007 |
| FR | 2752865 A1 | 3/1998 |

* cited by examiner

SELF-ADJUSTING STRIKER ASSEMBLY

CROSS-REFERENCE TO RELATED APPLICATIONS

This application is a continuation-in-part of co-pending U.S. patent application Ser. No. 13/305,856 filed Nov. 29, 2011 which is a continuation-in-part of application Ser. No. 12/714,893 filed Mar. 1, 2010 now Letters U.S. Pat. No. 8,382,171. U.S. application Ser. Nos. 12/714,893 and 13/305,856 are expressly incorporated herein by reference in their entirety to form part of the present disclosure.

FIELD OF THE INVENTION

This invention relates to tool boxes, and, more particularly, to a self-adjusting striker assembly for use with latches in tool boxes that accommodates misalignment between the lid of the box and the latches.

BACKGROUND OF THE INVENTION

One of the most popular accessories for trucks and recreational vehicles is a truck tool box used to store and secure a variety of tools and other items in the bed of the vehicles. There are a number of different types of truck boxes, including cross-over boxes, side mount boxes, chest boxes, top mount boxes, RV boxes and others. Each truck box is typically formed of aluminum tread plate, and comprises a front wall, a back wall, a bottom wall and opposed end walls which are interconnected to define a hollow interior. The truck box interior is closed by a top lid that is pivotal on one or more hinges, usually with the assistance of gas springs.

In many truck box designs, one or more latch mechanisms and striker bars are provided to maintain the top lid in a closed and locked position to secure the contents of the box. The latch mechanism(s) may be mounted to the front wall of the box, for example, in which case the striker bar(s) is mounted to the top lid. When the top lid is closed, each striker bar engages a latch mechanism to lock the top lid in place. In order for the striker bar and latch to properly engage one another, they must be in alignment, which, in turn, depends on appropriate alignment of the top lid and the body of the truck box. Many factors can contribute to altering the relationship between the top lid and box body, including rough handling during shipment, improper installation on the vehicle, damage to the body panels of the box during off-road adventures or the like and other factors. If each latch does not align with a striker bar, adjustment must be made in order for the top lid to properly close and lock.

Many striker bar—latch constructions in the prior art permit manual adjustment of the striker bar with respect to the latch. Typically, the position of the striker bar may be altered by loosening nuts securing the striker bar to the top lid or front wall of the box and then manually shifting its position relative to the latch. This can be a tedious exercise, and seems to invariably occur when the vehicle owner has the least amount of time to correct the situation.

Self-adjusting striker bar assemblies have been suggested in the prior art as a means of providing at least some adjustment of the position of the striker bar relative to the latch without the need for manual intervention. See, for example, U.S. Pat. Nos. 7,416,228 and 5,342,103. In these patents, the striker bar is pivotally mounted to the top lid or box body and can move in a swinging, pendulum-type motion relative to the latch mechanism which is mounted on or adjacent to a plate formed with a notch. In the event of misalignment between the striker bar and latch mechanism, the striker bar contacts a side of the notch and pivots to a position in alignment with the latch mechanism.

SUMMARY OF THE INVENTION

This invention is directed to a self-adjusting striker assembly for use with a truck box, or essentially any other type of box, having a hollow interior defined by a front wall, a back wall, a bottom wall, opposed end walls and a pivotal top lid. The self-adjusting striker assembly provides for substantially linear movement of a striker bar, in a direction between the end walls of the box, so that it can properly align with a latch mechanism even if the relationship between the top lid of the box and the box body is altered.

One presently preferred embodiment of the self-adjusting striker assembly of this invention may comprise a base mounted to the top lid of the box assuming the latch mechanism is connected to the box body. The base is formed with an elongated recess within which first and second threaded studs are mounted. A generally L-shaped bracket is provided including a bottom plate formed with first and second openings separated by a partition, and a perpendicular side plate having a slot for mounting a striker bar. The first and second studs of the base are received within respective openings in the bottom plate of the bracket, and such openings at least partially overlie the elongated recess in the base. A first spring is placed in the recess of the base, and extends into the first opening of the bottom plate of the bracket between the first stud and partition. A second spring is placed in the same position in the second opening of the bottom plate. The bottom plate of the bracket is sandwiched between the base and a capture plate which rests atop the bottom plate and mounts to the studs extending from the base.

In alternative embodiments, the L-shaped bracket is received within a channel formed in a modified base and retained in place by first and second posts each extending through one of the openings in the bottom plate of the bracket and fixed to the base. A spring element, preferably in the form of one or more plates made of spring steel or similar material, is connected between the bracket and the base.

A still further embodiment of this invention includes a modified bracket and base. The bottom plate of the bracket is captured within a channel formed in the base and has spaced spring stops, one at each end of the bracket. A coil spring is located between each spring stop and a centrally disposed post connected to the base.

Unlike the prior art noted above, the self-adjusting striker assembly of this invention permits movement of the bracket, and, in turn, the striker bar, in a substantially linear direction generally coincident or parallel to with the longitudinal axis of the base. A guide plate formed with a notch may be mounted to or in proximity with each latch mechanism so that in the event of misalignment between the striker bar and latch mechanism the striker bar may contact the notch in the guide plate and linearly shift its position so as to properly align with and engage the latch mechanism. Additionally, the vertical position of the striker bar within the slot in the side plate of the bracket may be manually adjusted.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
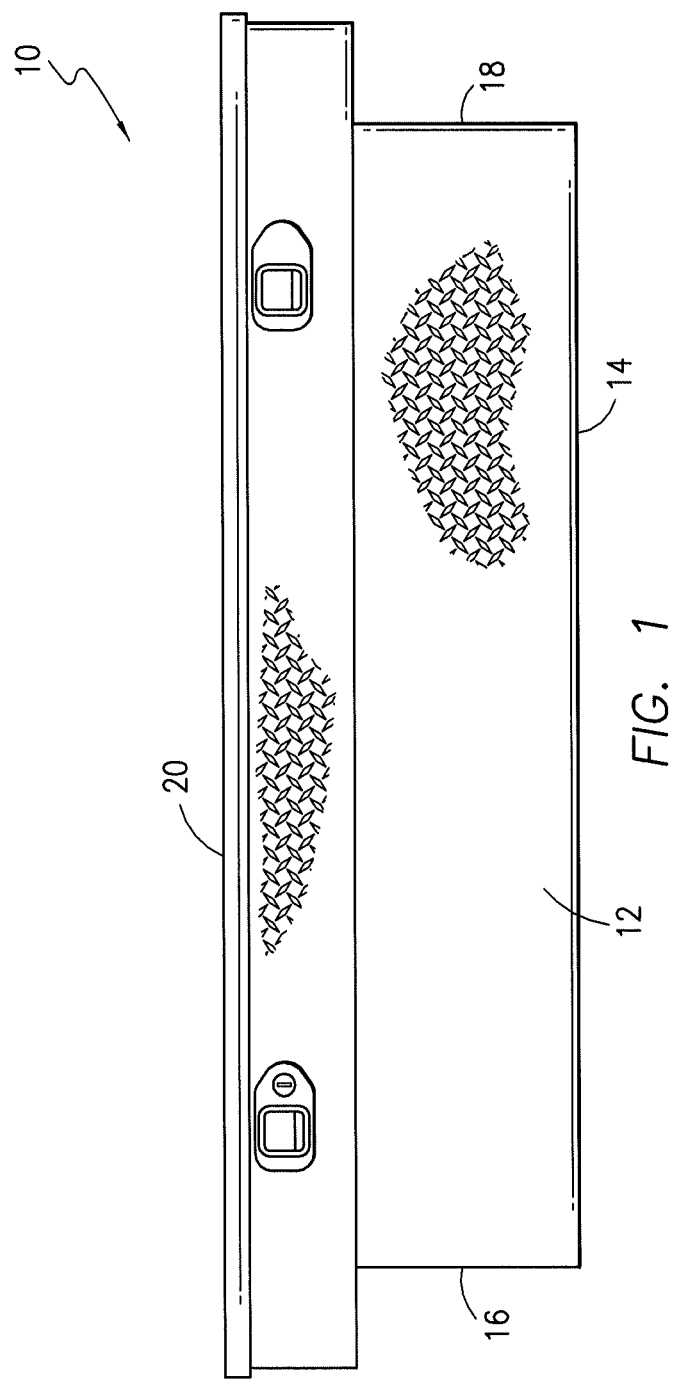
FIG. 1 is a front view of one type of truck box with which the self-adjusting striker assembly of this invention may be utilized.

Referring initially to FIG. 1, a truck tool box 10 is schematically depicted which comprises a front wall 12, a back wall (not shown), a bottom wall 14, opposed end walls 16 and 18, and, a top lid 20 pivotally mounted to the back wall. The walls 12-18 are interconnected to form a hollow interior. It should be understood that the particular configuration of the box 10 shown in FIG. 1 is intended for purposes of illustration only, and the invention described below is applicable to essentially any type of box including various other truck tool boxes such as side mount boxes, chest boxes, top mount boxes and RV boxes. For purposes of the present discussion, terms "front," "rear," "top," "bottom," "upwardly," "downwardly," "inwardly," "outwardly" and the like refer to the orientation of the truck tool box 10 as viewed in FIG. 1.

Figure 2:
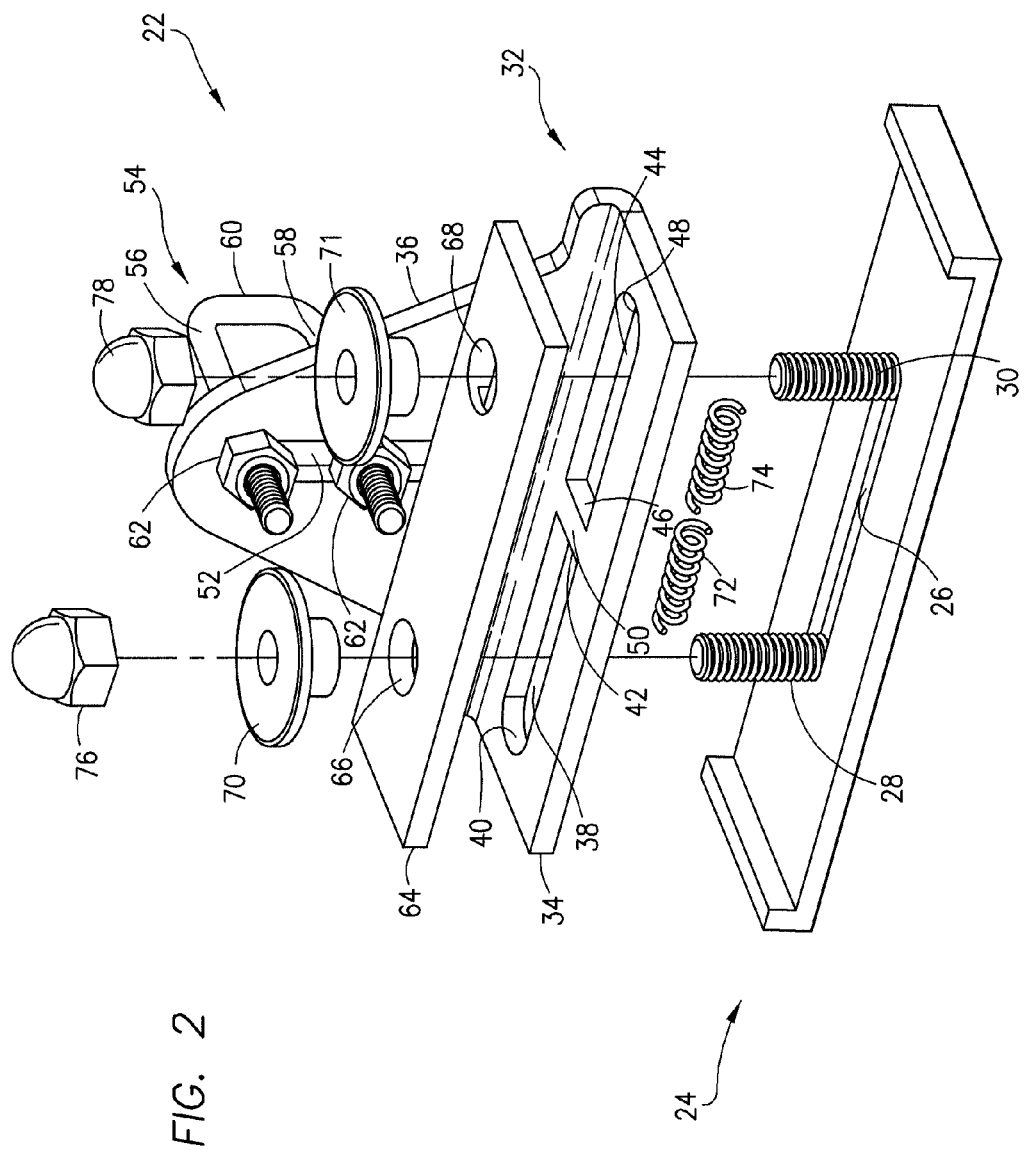
FIG. 2 is a disassembled, perspective view of one embodiment of the assembly herein.
Figure 3:
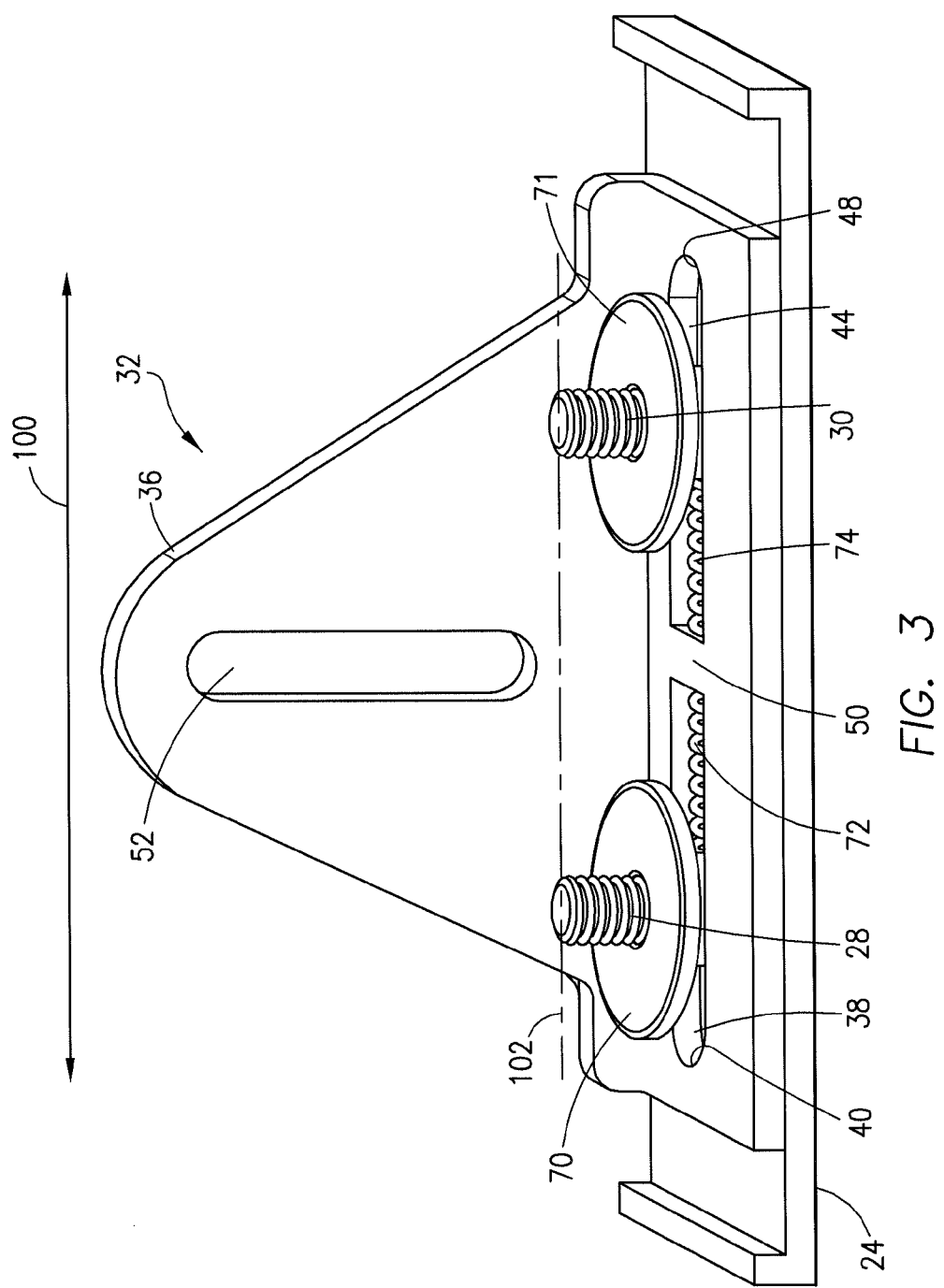
FIG. 3 is a perspective view of a portion of the assembly shown in FIG. 1.

Referring now to FIGS. 2 and 3, one embodiment of a self-adjusting striker assembly 22 according to this invention is illustrated. The assembly 22 comprises a base 24 formed with an elongated recess 26. A threaded stud 28 is mounted at one end of the recess 26, and a second threaded stud 30 is mounted at the opposite end. A generally L-shaped bracket 32 is mounted to the base 10, as described below, and it is formed with a horizontally extending bottom plate 34 connected to or integrally formed with a vertically extending side plate 36.

The bottom plate 34 of bracket 32 is formed with a first opening 38 having opposed ends 40 and 42, and, a second opening 44 having opposed ends 46 and 48. The ends 42 and 46 of openings 38, 44, respectively, are separated by a partition 50. The side plate 36 of the bracket 32 is formed with a vertically extending, elongated slot 52 which mounts a striker bar 54, preferably in the form of a U-bolt. The striker bar 54 has spaced arms 56 and 58 connected by a cross member 60. The end of each arm 56, 58 is threaded to receive nuts 62, one located on either side of the side plate 36, and the position of the striker bar 54 may be adjusted vertically along the slot 52 by loosening the nuts 62, sliding the striker bar 54 to the desired position, and then tightening the nuts 62. A capture plate 64 is also provided which is formed with spaced through holes 66 and 68. Each through hole 66, 68 receives a flange washer 70 and 71, respectively.

The striker assembly 22 may be assembled as follows. Initially, the bottom plate 34 of the bracket 32 is placed onto the base plate 24 so that the stud 28 extends through the first opening 38 in the bottom plate 34 and the stud 30 extends through the second opening 44. As best seen in FIG. 3, a first coil spring 72 is fitted into the recess 26 in base 24 and into that portion of the first opening 38 in the bottom plate 34 of bracket 32 between the partition 46 and stud 28, e.g. the ends of the first coil spring 72 extend between the end 42 of opening 38 and stud 28. Similarly, a second coil spring 74 is fitted into the recess 26 and into that portion of the first opening 44 in the bottom plate 34 between the partition 50 and the stud 30.

With the coil springs 72, 74 in place, the capture plate 64 may be positioned atop the bottom plate 34 of bracket 32 such that the stud 28 of base 24 extends through the opening 66 of the capture plate 64 and the stud 30 extends through the opening 68 therein. The flange washer 70 is inserted through the through hole 68 in capture plate 64, and then through the opening 38 in the bottom plate 34 of bracket 32, onto the stud 28. A portion of the stud 28 protrudes upwardly from the capture plate 64 to receive a cap nut 76. The flange washer 71 is assembled in the same way onto stud 30, and a second cap nut 78 may be tightened down on the exposed end of the stud 30. FIG. 3 illustrates the flange washers 70 and 71 in place on respective studs 28, 30, with the capture plate 64 being removed for ease of illustration. The capture plate 64 and flange washers 70, 71 position the bottom plate 34 of the bracket 32 such that a space is provided between the stud 28 and the end 40 of opening 38 in bottom plate 34 and between the stud 30 and the end 48 of the opening 44.

Figure 4:
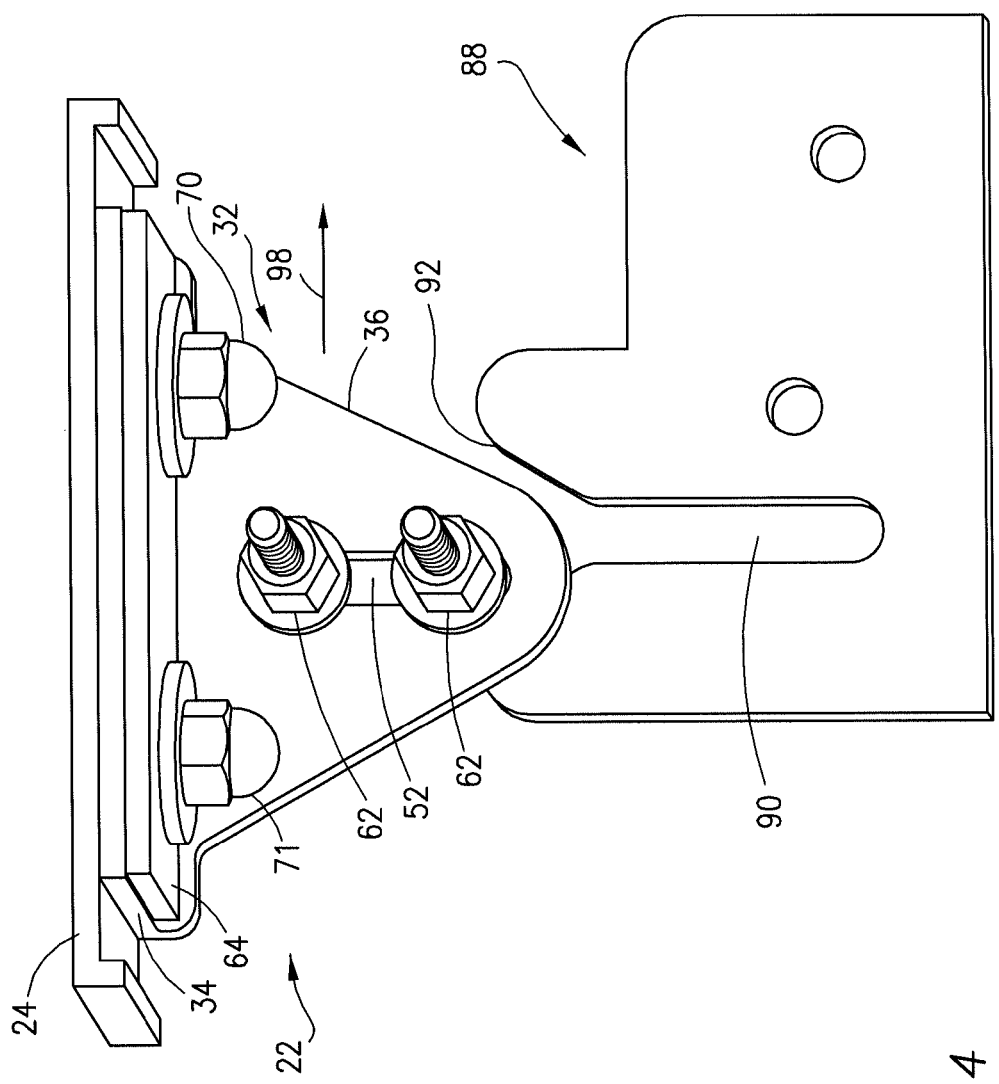
FIG. 4 is a perspective view of the assembly illustrated in FIGS. 2 and 3 in an assembled condition, and a guide plate employed with a latch mounted to the truck box.
Figure 5:
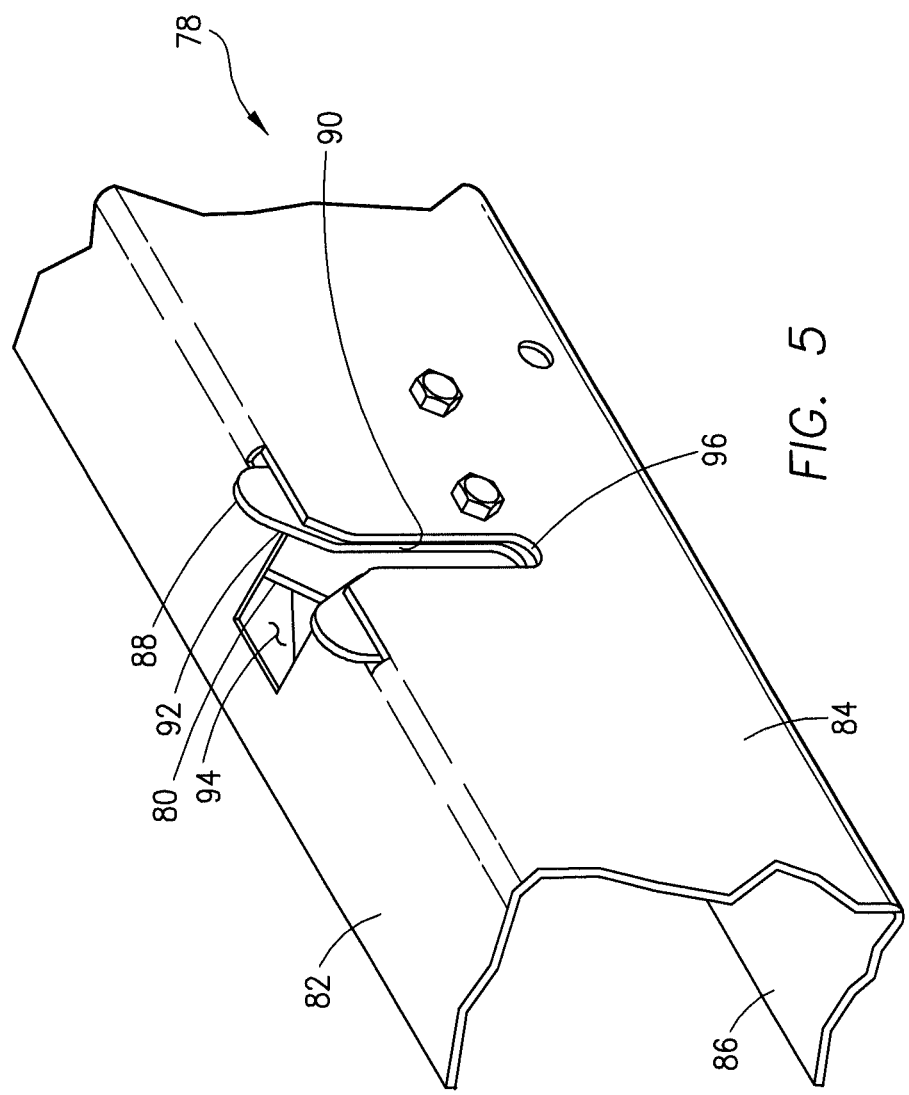
FIG. 5 is perspective view of a portion of a mounting rail located along the front wall of the truck box, showing a portion of a latch and the guide plate depicted in FIG. 4.

As noted above, the striker assembly 22 of this invention is employed with a latch to close, and in some designs, lock the box 10. Referring to FIGS. 4 and 5, a mounting rail 78 may be connected to the front wall 12 of the box 10 to receive and mount a latch 80. The mounting rail 78 has a top plate 82, a side plate 84 and a bottom plate 86 which are connected to form a channel structure as shown in FIG. 5. Only a portion of the mounting rail 78 is depicted in FIG. 5, and it should be understood that it extends along the length of the front wall 12 between the end walls 16, 18. Additionally, preferably two latches 80 and two striker assemblies 22 are employed with most boxes 10.

The guide plate 88 is preferably mounted either on or immediately adjacent to the latch 80. The guide plate 88 is formed with a notch 90 having an expanded mouth or open end 92. A cutout 94 is formed in the top plate 82 of mounting rail 78, and a slot 96 extends along its side plate 84. As seen in FIG. 5, the latch 80 and guide plate 88 are connected to the mounting rail 78 so that the open end 92 of the guide plate 88 aligns with the cutout 94 and its notch 90 aligns with the slot 96 in side plate 84.

In the preferred embodiment, the striker assembly 22 may be mounted to the top lid 20 of the box 10 and the latch 80 may be connected to the moving rail 78 in alignment with the striker assembly 22, e.g. the orientation depicted in FIG. 4. However, it should be understood that the positions of the striker assembly 22 and latch 80 could be reversed. The latch 80 has been removed in FIG. 4 for clarity, and for purposes of the discussion below.

The first and second coil springs 72, 74 bias the bracket 32 to a neutral position as depicted in FIG. 3. The term "neutral"

in this context refers to a centered position of the bottom plate 34 of bracket 32 on the base 24. If the striker assembly 22 and latch 80 are correctly aligned with one another, as the top lid 20 is closed the striker bar 54 enters notch 90 in guide plate 88 and extends into engagement with the latch 80 without contacting the guide plate 88 along its open end 92. In the event of misalignment between the striker bar 54 and latch 80, as the top lid 20 is closed the striker bar 54 makes contact with the open end 92 of the notch 90 in guide plate 88. For purposes of illustration, the striker bar 54 is shown engaging the left-hand side of the open end 92 of notch 90 in FIG. 4. With such misalignment, upon contact of the striker bar 54 with the open end 92 of notch 90 the bracket 32 moves to the right along base 10 in the direction of arrow 98. As the top lid 20 continues to close, the striker bar 54 slides along the side of open end 92 and then enters the notch 90 in guide plate 88 so that it can properly engage the latch 80.

Referring to FIG. 3, the connection between the base 24 and bracket 32 allows for movement of the bracket 32 with respect to base 24 in the direction of arrow 100. Such movement is substantially linear, e.g. generally along an axis 102 extending in between the studs 28, 30, as schematically depicted in FIG. 3. The axis 102 may be coincident with or parallel to the longitudinal axis of the base 24. When misalignment between the striker bar 54 and the notch 90 in guide plate 88 occurs, the bracket 32 is moved to the left or to the right as viewed in FIG. 3 thus compressing one of the first and second coil springs 72, 74. For example, movement of the bracket 32 to the right as viewed in FIG. 3 causes the second coil spring 74 to compress in between stud 30 and partition 50. The opposite stud 28 acts as a stop to limit such right-hand movement because the end 40 of opening 38 in the bottom plate 34 of bracket 32 engages the stud 28 thus preventing further movement to the right. The extent of travel of the bracket 32 to the right is governed by the space between the stud 28 and the end 40 of the opening 38 in bottom plate 34. The same thing occurs upon movement of the bracket 32 to the left as viewed in FIG. 4, e.g. the first coil spring 72 is compressed between the stud 28 and partition 50, and the stud 30 stops such movement to the left upon engagement with the end 48 of opening 44 in the bottom plate 34 of bracket 32. Once the striker bar 54 disengages the latch 80, such as when the top lid 20 is moved to an open position, whichever coil spring 72, 74 that was compressed, as noted above, biases the bracket 32 back to the neutral position.

Figure 6:
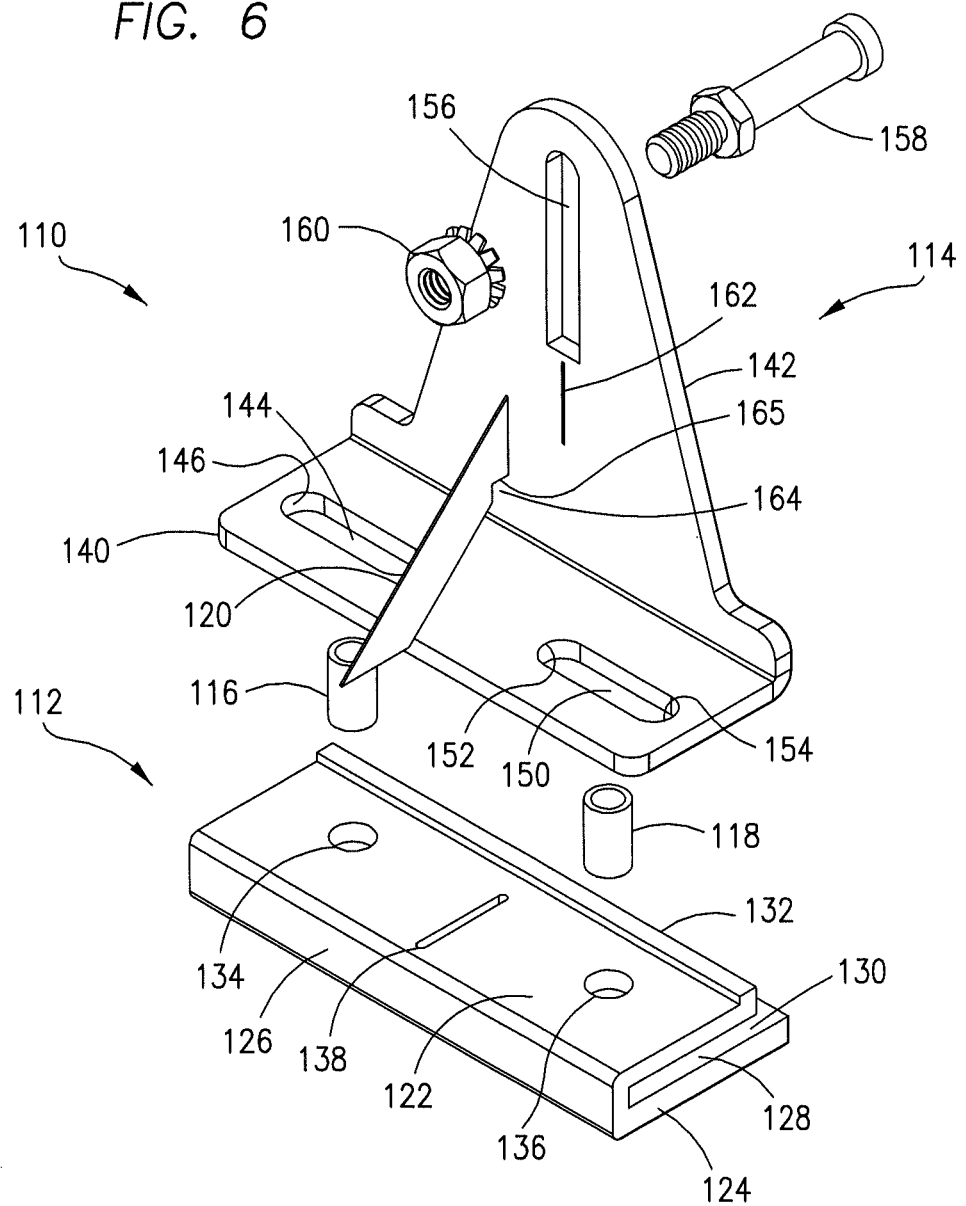
FIG. 6 is a disassembled, perspective view of an alternative embodiment of the self-adjusting striker assembly of this invention.
Figure 7:
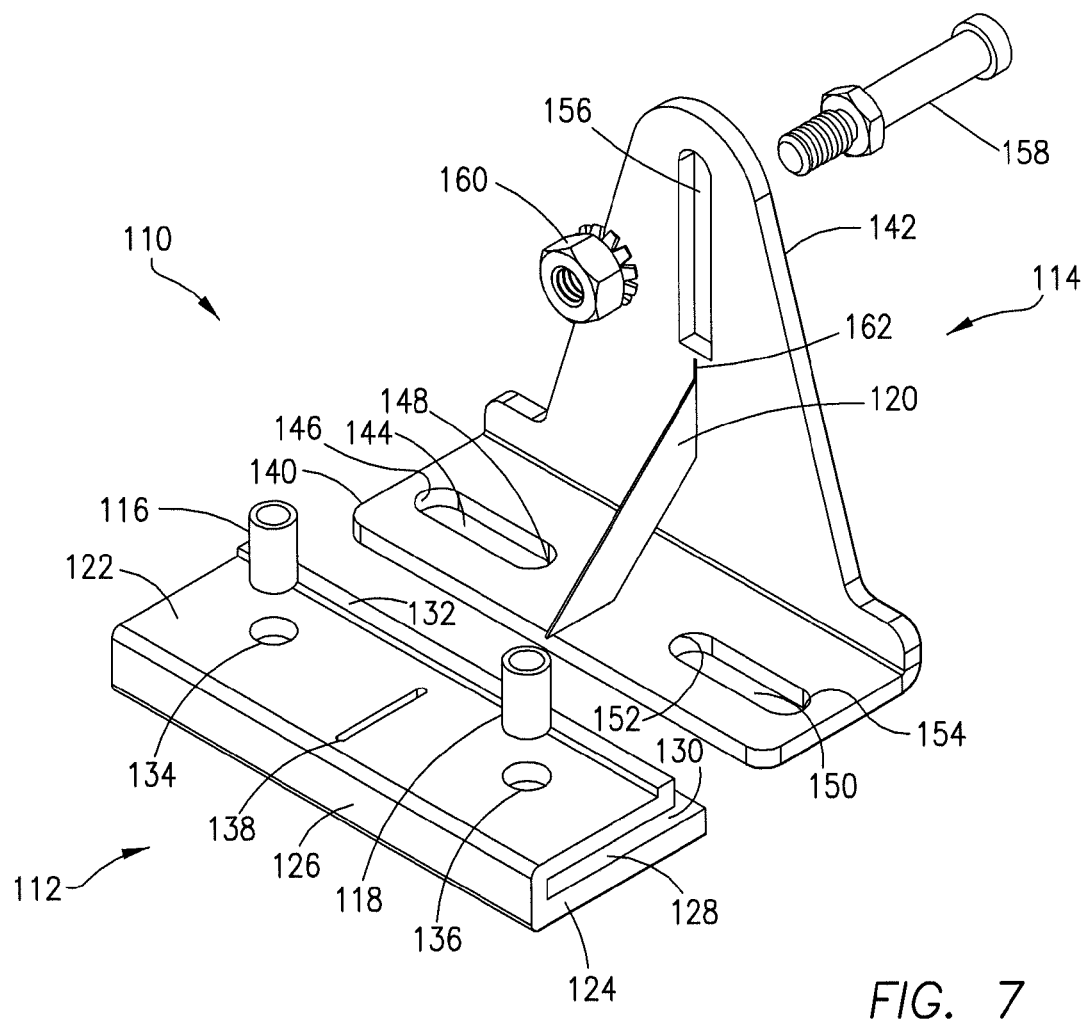
FIG. 7 is a view similar to FIG. 6, except with a spring element mounted to the L-shaped bracket.
Figure 8:
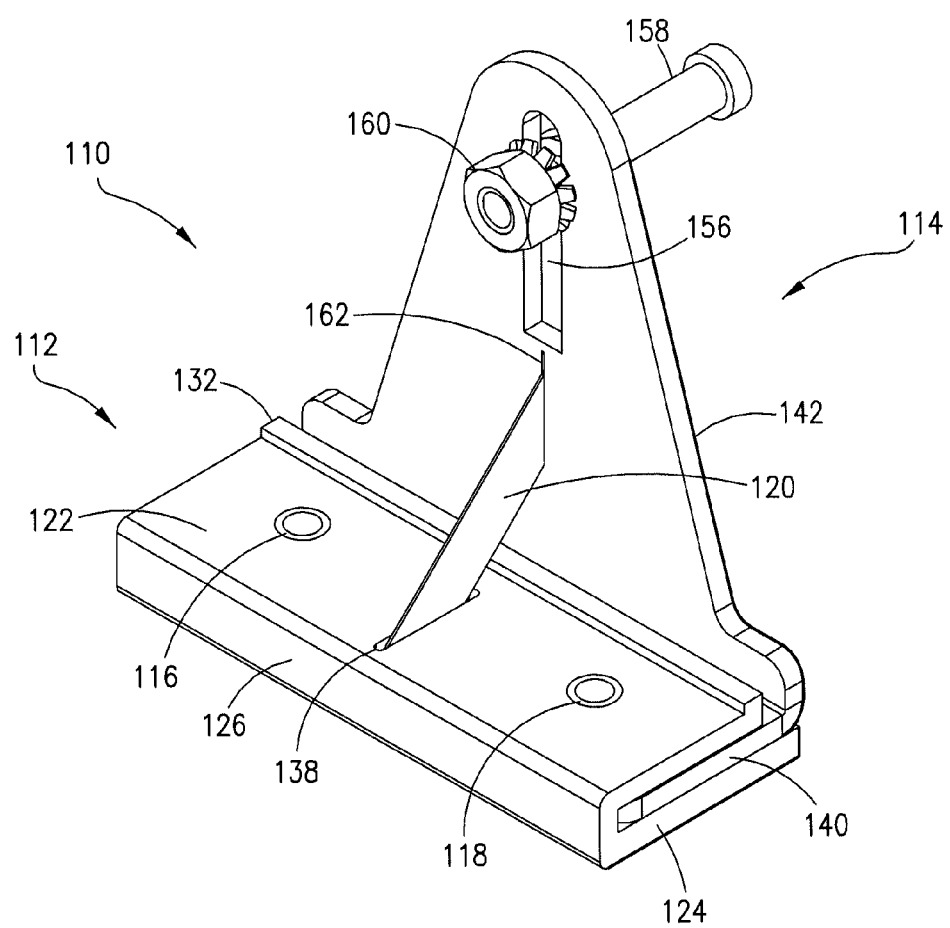
FIG. 8 is an assembled view of the striker assembly shown in FIG. 6.

Referring now to FIGS. 6-8, one alternative embodiment of a self-adjusting striker assembly 110 of this invention is illustrated. The assembly 110 comprises a base 112, a bracket 114, posts 116 and 118, and, a spring element 120. The base 112 includes an upper plate 122 and a lower plate 124 which are joined to one another along a side edge 126 of the base 112 forming a channel 128 between them having an entrance 130 extending along the length of the base 112. The upper plate 122 of base 112 has a lip 132 located at the entrance 130 to the channel 128, and it is formed with spaced bores 134, 136 and a base mounting slit 138.

The bracket 114 comprises a bottom plate 140 connected to a side plate 142. The bottom plate 140 is formed with a first opening 144 having opposed ends 146, 148, and a second opening 150 with opposed ends 152, 154 which is spaced from the first opening 144. The side plate 142 has an elongated slot 156 that may receive a striker bar 158 which may be connected to the side plate 142 by a nut 160. The striker bar 54 shown in FIG. 2 and described above may optionally be connected to the side plate 142. A bracket mounting slit 162 is formed in the side plate 142 of bracket 114, just beneath the elongated slot 156.

The striker assembly 110 may be assembled by inserting the bottom plate 140 of bracket 114 through the entrance 130 and into the channel 128 formed in the base 112. In this position, each of the bores 134 and 136 formed in the upper plate 122 of base 112 align with the openings 144 and 150, respectively, in the bottom plate 140 of bracket 114. The post 116 is inserted through the bore 134 and opening 144 into engagement with the lower plate 124 of base 112, and the post 118 is inserted through bore 136 and opening 150 into engagement with the lower plate 124. The posts 116 and 118 are preferably fixed in place to the upper plate 122 of base 112 by crimping, soldering or any other suitable means. With the base 112 and bracket 114 connected together, one end of the spring element 120 is inserted into the base mounting slit 138 and its opposite end is inserted into the bracket mounting slit 162 where it is fixed in place by soldering or any other means of attachment. A notch 164 may be provided in one end of the spring element 120 forming a generally horizontally extending leg 166, in the orientation depicted in FIGS. 6-8, which rests atop the bottom edge of the bracket mounting slit 162 for additional support. As seen in FIGS. 6-8, the spring element 120 is a single plate preferably made of spring steel or other resilient material which is capable of being deflected in a side-to-side direction but then returning to the position shown in the Figs.

Figure 9:
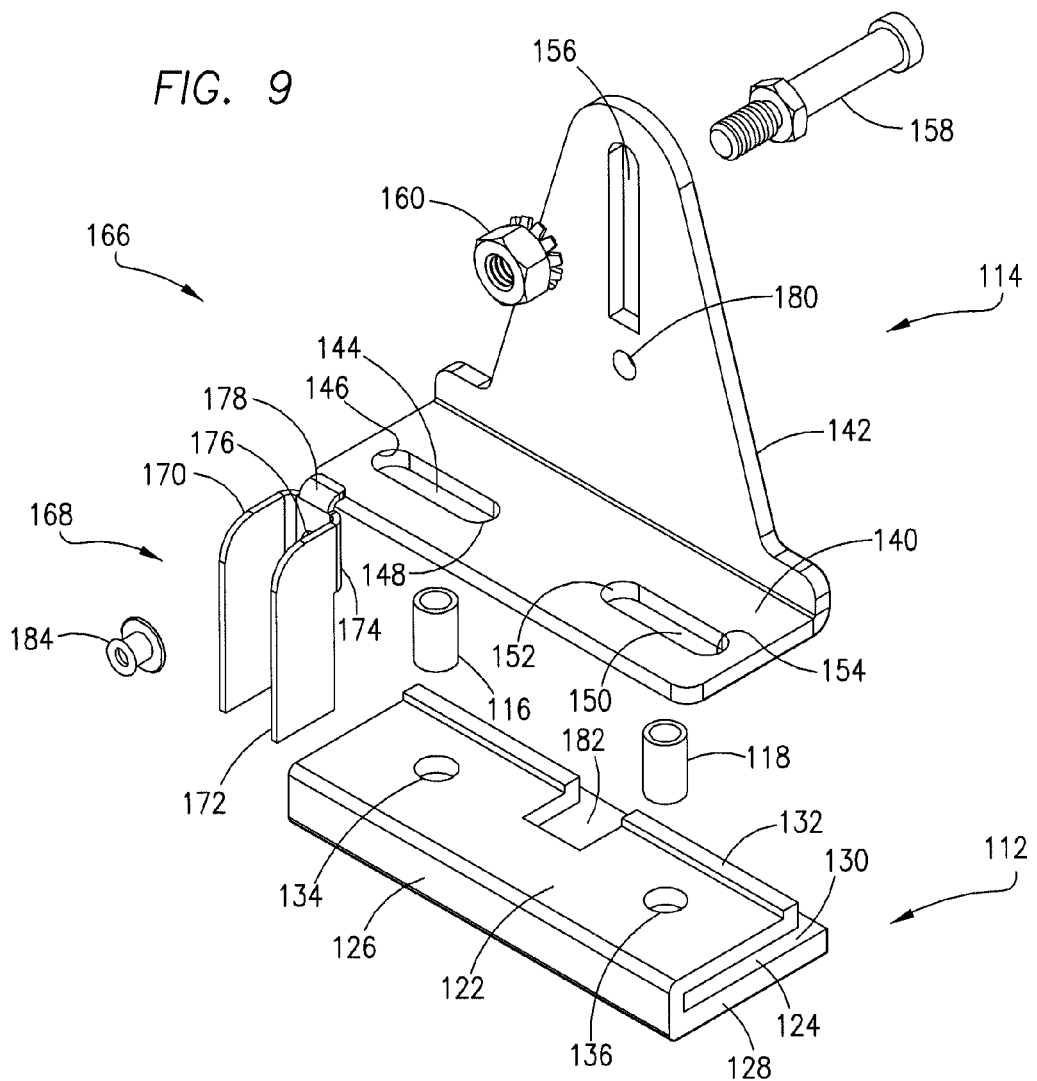
FIG. 9 is a view similar to FIG. 6 except illustrating a still further embodiment of the striker assembly herein.
Figure 10:
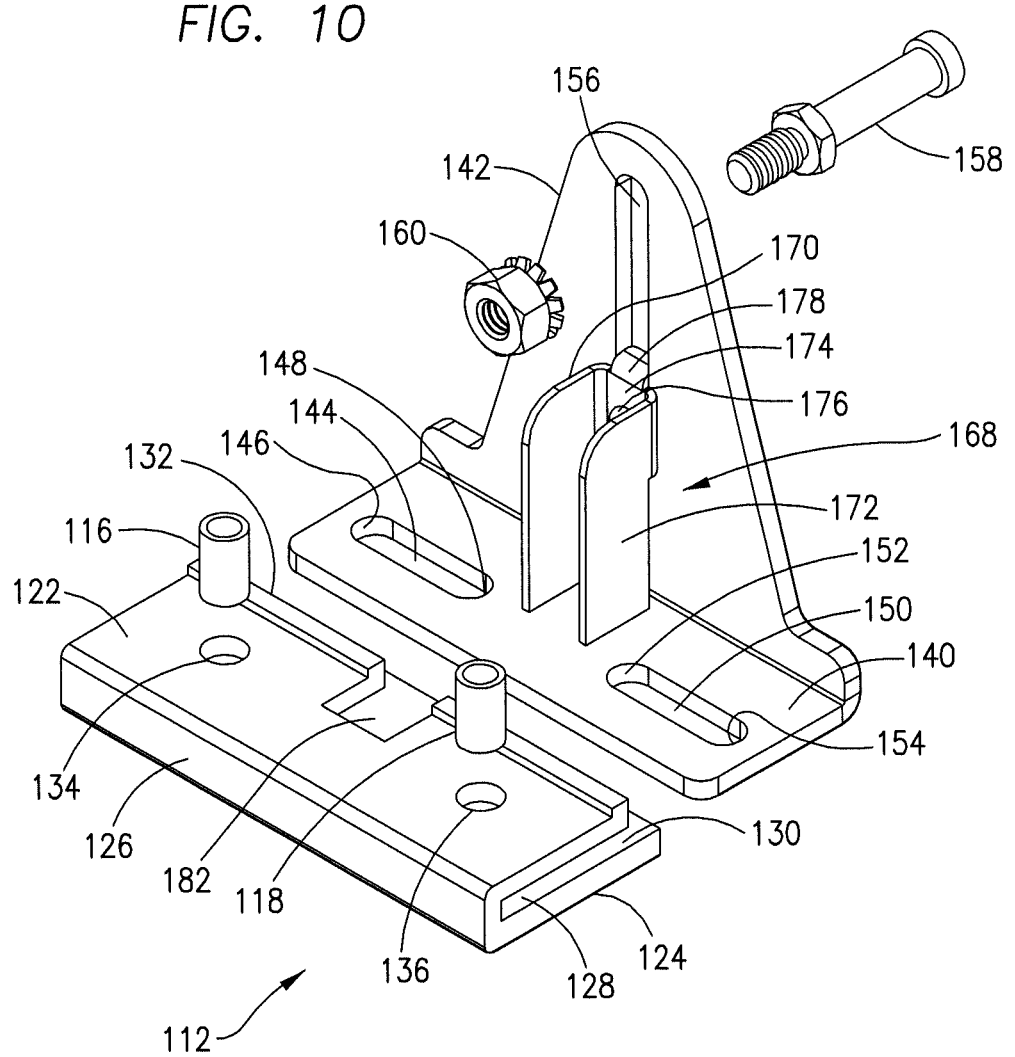
FIG. 10 is a view similar to FIG. 9 except with the spring element mounted to the L-shaped bracket.
Figure 11:
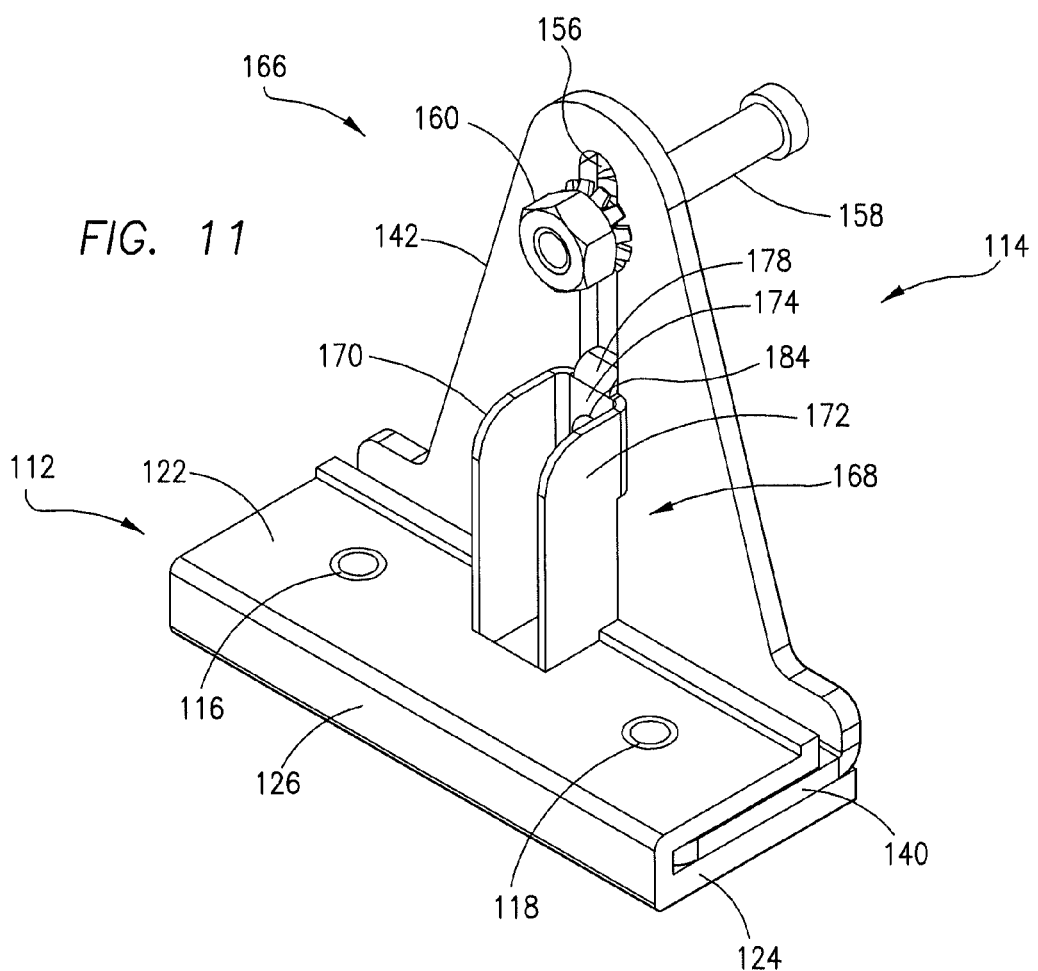
FIG. 11 is an assembled view of the striker assembly illustrated in FIG. 9.

An alternative embodiment of a striker assembly 166 is illustrated in FIGS. 9-11. It is similar to assembly 110, and the structure of assembly 166 which is common to that of assembly 110 is identified with the same reference numbers. The primary difference between the assemblies 110, 166 is that an alternative embodiment of a spring element 168 is employed in assembly 166. Instead of the single plate employed in spring element 120, the spring element 168 in the embodiment of FIGS. 9-11 comprises spaced spring plates 170 and 172 connected by a mounting plate 174. The mounting plate 174 is formed with a bore 176, and a finger 178 is connected to the top of the mounting plate 174.

The base 112 and bracket 114 employed in the assembly 166 of FIGS. 9-11 are modified slightly compared to the assembly 110 in order to accommodate the spring element 168. A hole 180 is formed in the side plate 142 of bracket 114, and the upper plate 122 of base 122 has a cut-out 182. The base 112 and bracket 114 are connected to one another in the same manner as described above in connection with a discussion of FIGS. 6-8. In order to mount the spring element 168 in place, the finger 178 is placed at the bottom of the elongated slot 156 in the side plate 142 of bracket 114 so that the bore 176 in the side plate 142 aligns with the hole 180 in the mounting plate 174 of the spring element 168. A rivet 184 is preferably employed to connect the mounting plate 174 to the side plate 142. The bottom portion of the spring element 168 is received within the cut-out 182 formed in the upper plate 122 of the base 112 where it is attached by soldering or other suitable means.

Both of the striker assemblies 110 and 166 operate in a manner generally similar to the striker assembly 22, and are intended for use with a latch 80 as described above with reference to a discussion of FIGS. 4 and 5. Essentially the same substantially linear movement of the bracket 114 relative to the base 112 is achieved in the assemblies 110 and 166 as that obtained with the assembly 22. The bracket 114 is linearly movable relative to the base 112 to the extent permitted by the dimensions of the openings 144 and 150 in the bottom plate 140 of bracket 114. In one direction of linear motion, the post 116 engages the side 146 of opening 144 and the post 118 engages the side 152 of opening 150 to establish the limit of such motion in that direction. Linear movement of the bracket 114 in the opposite direction is stopped upon contact of the post 116 with the side 148 of opening 144 and contact of post 118 with the side 154 of opening 150. Each of the spring elements 120 and 168 of respective assemblies 110 and 166 act to bias the bracket 114 to a neutral or generally centered position relative to base 112. When the bracket 114 is moved in one linear direction or the other, due to misalignment of the striker bar 158 or 60 with the notch 90 in guide plate 88 of latch 80, the spring elements 120, 168 deflect in such direction of movement but then are effective to return the bracket 114 to such neutral position.

Figure 12:
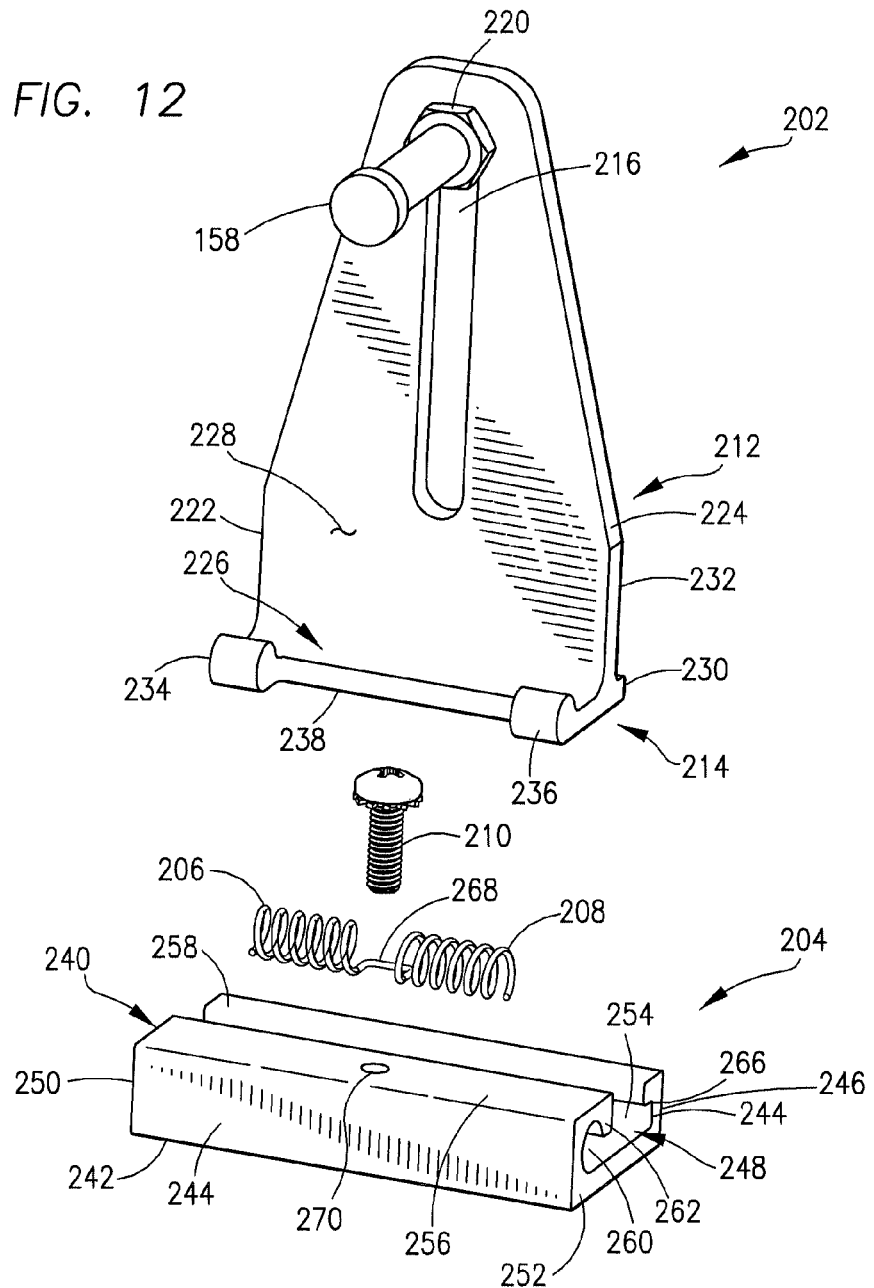
FIG. 12 is a disassembled perspective view of a still further embodiment of the striker assembly of this invention.
Figure 13:
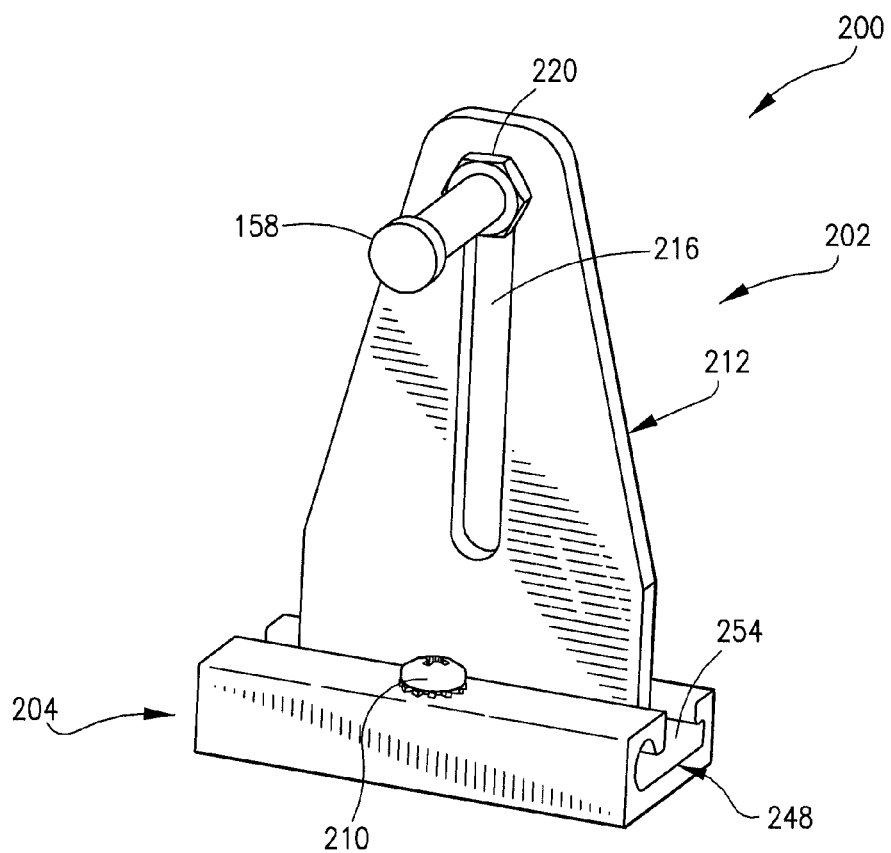
FIG. 13 is an assembled view of the sticker assembly shown in FIG. 12.

Referring now to FIGS. 12 and 13, a still further embodiment of a striker assembly 200 according to this invention is shown. The striker assembly 200 comprises a bracket 202, a base 204, first and second coil springs 206, 208 and a post 210. The bracket 202 includes a side plate 212 connected to or integrally formed with a bottom plate 214 such that they are substantially perpendicular to one another. An elongated slot 216 is formed in the side plate 210 which may receive a striker bar 158, such as shown in FIG. 11, or the striker bar 54 depicted in FIG. 2. A nut 220 secures the striker bar 158 in position to the side plate 210.

The bottom plate 214 of bracket 202 extends along the entire width of the bracket 202, from one edge 222 to the opposite edge 224, and forms an inverted "T" with the side plate 212 of bracket 202, e.g. a front section 226 of the bottom plate 214 projects from the front surface 228 of the side plate 212 and an extension 230 projects from the rear surface 232 thereof. The front section 226 is formed with a spring stop 234 adjacent the edge 222 of side plate 212, a second spring stop 236 at the opposite edge 224 and an elongated cut-out 238 between stops 234, 236. Preferably, the spring stops 234, 236 are generally cylindrical in shape, although they could have other configurations such as rectangular.

The base 204 of striker assembly 200 is generally rectangular in shape and includes a top wall 240, a bottom wall 242 and opposed side walls 244, 246 which are interconnected to form a hollow interior defining a channel 248 which extends longitudinally from one end 250 of the base 204 to its opposite end 252. The channel 248 is configured to receive and capture the bottom plate 214 of bracket 202. In the presently preferred embodiment, the top wall 240 of the base is separated by a gap 254 forming a front portion 256 and rear portion 258 thereof. The front part of the channel 248 is defined by the front portion 256 of top wall 240, the side wall 244 and a portion of the bottom wall 242 of base 204 and a lip 262 extending downwardly from the front portion 256 which collectively form a cavity 260. The rear part of the channel 248 is defined by a recess 264 in the side wall 246 and the rear portion 258 of the top wall 240 of base 204 creating an overhang 266.

The striker assembly 200 may be assembled by initially placing the first and second coil springs 206, 208 in between the spring stops 234 and 236 of the base 204. As shown in FIG. 12, the springs 206, 208 are preferably connected to one another by a wire 268 for ease of handling. The length of the springs 206, 208, including the wire 268 that connects them, is approximately equal to the spacing between spring stops 234 and 236 such that each spring 206, 208 engages a respective stop 234, 236 with minimal compression. The bottom plate 214 of the bracket 202 may then be slid into the channel 248, from either end 250, 252 of the base 204, such that the side plate 212 of the bracket 202 is approximately centered on the base 204. The width of the gap 254 in the channel 248 is larger than the thickness of the side plate 212 of the bracket 202 to avoid contact with the top wall 240 of the base 204. With the side plate 212 centered, the wire 268 connecting the two springs 206, 208 aligns with an internally threaded bore 270 formed in the front portion 256 of the channel 248. The post 210, preferably in the form of a threaded fastener, may be inserted into the bore 270 and into engagement with the base of channel 248 in position between the two springs 206, 208. The cut-out 238 formed between the two spring stops 234, 236 prevents contact between the post 210 and the bottom plate 214 of bracket 202. In the course of insertion of the bottom plate 214 into the channel 248, the spring stops 234 and 236 are received within the cavity 260 and the extension 230 of the bottom plate 214 is received within the recess 264. Disengagement of the bottom plate 214 from the base 204 is prevented by the lip 262 at the front portion 256 of the channel 248, and by the overhang 266 at the rear portion 258 thereof.

The striker assembly 200 operates in a manner generally similar to striker assemblies 22, 110 and 166, and is intended for use with the latch 80, as described above. The bracket 202 is movable substantially linearly, e.g. along the gap 254 in channel 248 which may be generally coincident with or parallel to the longitudinal axis of base 204, against the spring force exerted by the first and second springs 206, 208. In the event the bracket 202 is urged to the left as viewed in FIGS. 12 and 13, toward the end 250 of base 204, the first coil spring 206 is compressed against the spring stop 234 and the second coil spring 208 is compressed against the post 210. Both springs 206, 208 exert a return force on the bracket 202 in a direction toward the opposite end 252 of base 204. Similarly, the application of a force to the bracket 202 in the right-hand direction, toward the end 252 of base 204, causes the first coil spring 206 to compress against the post 210 and the second coil spring 208 to compress against the spring stop 236. In this instance, the springs 206, 208 exert a return force on the bracket 202 in the direction toward the end 250 of base 204. The extent of linear movement of the bracket 202 relative to base 204 is governed by the stiffness of springs 206, 208 and/or the length of such springs 206, 208 when they are fully compressed with their coils in contact with one another.

The striker assemblies 22, 110, 166 and 200 provide a convenient means of accommodating misalignment between the striker bar 54 and latch 80. In some instances, the striker bars 54 or 158 may fail to properly engage the latch 80 due to a vertical misalignment. The term "vertical misalignment" refers to the relative position of the striker bars 54 or 158 and latch 80 when the top lid 20 is closed, wherein the striker bars 54 or 158 fail to seat within the latch 80 or are positioned too close to the latch 80. In that event, the striker bar 54 may be moved in a direction toward or away from the latch 80 when the top lid 20 is closed by adjusting its position along the slot 52 in the side plate 36 of bracket 22, or the striker bar 158 may be moved along the slot 156 in the side plate 142 of bracket 114, or, the striker bar 158 may be moved along the slot 216 in the side plate 212 of bracket 202.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A box, comprising:
   a number of interconnected walls forming a hollow interior having an open top, and a lid movable between an open position and a closed position relative to said open top;
   a latch mounted to one of said walls or to said lid;
   a striker assembly comprising:
   (a) a base mounted to the other of said one wall and said lid, said base including a top wall, a bottom wall, opposed first and second side walls and opposed ends, said top wall having a gap defining a first portion and a second portion thereof, said base being formed with a channel extending between said opposed ends which includes a cavity defined by said first side wall, a portion of said bottom wall and said first portion of said top wall;
   (b) a bracket having a side plate and a bottom plate, said bottom plate being positioned within said channel and at least partially within said cavity of said base so that said bracket is movable in a first direction toward one of said ends and in a second direction toward said opposite end;
   (c) a spring element located within said channel of said base in position to engage said bottom plate of said bracket, said spring element being effective to exert a return force on said bottom plate in response to movement of said bracket in either one of said first and second directions;
   (d) a striker bar mounted to said side plate of said bracket in position to engage said latch upon movement of said lid to said closed position, said bracket being movable relative to said base in either of said first and second directions in the event of misalignment between said striker bar and said latch.

2. The box of claim 1 in which a second part of said channel is defined by a recess formed in said second side wall, a portion of said bottom wall and said second portion of said top wall, said second portion of said top wall and said recess forming an overhang.

3. The box of claim 2 in which said bottom plate of said bracket is formed with an extension and spaced first and second spring stops, said bottom plate of said bracket being insertable within said channel of said base so that said first and second spring stops are located within said cavity of said channel and said extension is located within said recess of said second part of said channel.

4. The box of claim 3 further including a post mounted within said cavity of said channel between said opposed ends of said base.

5. The box of claim 4 in which said spring element comprises a first spring positioned within said cavity and extending between said first spring stop of said bottom plate of said bracket and said post, and a second spring positioned within said cavity and extending between said second spring stop of said bottom plate of said bracket and said post.

6. The box of claim 5 in which one of said first and second springs undergoes compression in response to movement of said bracket in said first direction and applies a return force to said bracket urging it in said second direction, and the other of said first and second springs undergoes compression in response to movement of said bracket in said second direction and applies a return force to said bracket urging it in said first direction.

7. The box of claim 1 in which said bracket is movable along said channel of said base in a substantially linear direction.

8. A striker assembly adapted for use with a box formed by a number of interconnected walls defining a hollow interior with an open top, a lid movable relative to the open top between an open and closed position, and, a latch mounted to the lid or to one of the walls of the box, said striker assembly comprising:
   a base adapted to mount to the other of the one wall and the lid, said base including a top wall, a bottom wall, opposed first and second side walls and opposed ends, said top wall having a gap defining a first portion and a second portion thereof, said base being formed with a channel extending between said opposed ends which includes a cavity defined by said first side wall, a portion of said bottom wall and said first portion of said top wall;
   a bracket having a side plate and a bottom plate, said bottom plate being positioned within said channel and at least partially within said cavity of said base so that said bracket is movable in a first direction toward one of said ends and in a second direction toward said opposite end;
   a spring element located within said channel of said base in position to engage said bottom plate of said bracket, said spring element being effective to exert a return force on said bottom plate in response to movement of said bracket in either one of said first and second directions;
   a striker bar mounted to said side plate of said bracket in position to engage said latch upon movement of said lid to said closed position, said bracket being movable relative to said base in either of said first and second directions in the event of misalignment between said striker bar and said latch.

9. The striker assembly of claim 8 in which a second part of said channel is defined by a recess formed in said second side wall, a portion of said bottom wall and said second portion of said top wall, said second portion of said top wall and said recess forming an overhang.

10. The striker assembly of claim 9 in which said bottom plate of said bracket is formed with an extension and spaced first and second spring stops, said bottom plate of said bracket being insertable within said channel of said base so that said first and second spring stops are located within said cavity of said channel and said extension is located within said recess of said second part of said channel.

11. The striker assembly of claim 10 further including a post mounted within said cavity of said channel between said opposed ends of said base.

12. The striker assembly of claim 11 in which said spring element comprises a first spring positioned within said cavity and extending between said first spring stop of said bottom plate of said bracket and said post, and a second spring positioned within said cavity and extending between said second spring stop of said bottom plate of said bracket and said post.

13. The striker assembly of claim 12 in which one of said first and second springs undergoes compression in response to movement of said bracket in said first direction and applies a return force to said bracket urging it in said second direction, and the other of said first and second springs undergoes compression in response to movement of said bracket in said second direction and applies a return force to said bracket urging it in said first direction.

14. The striker assembly of claim 8 in which said bracket is movable along said channel of said base in a substantially linear direction.

* * * * *